United States Patent Office

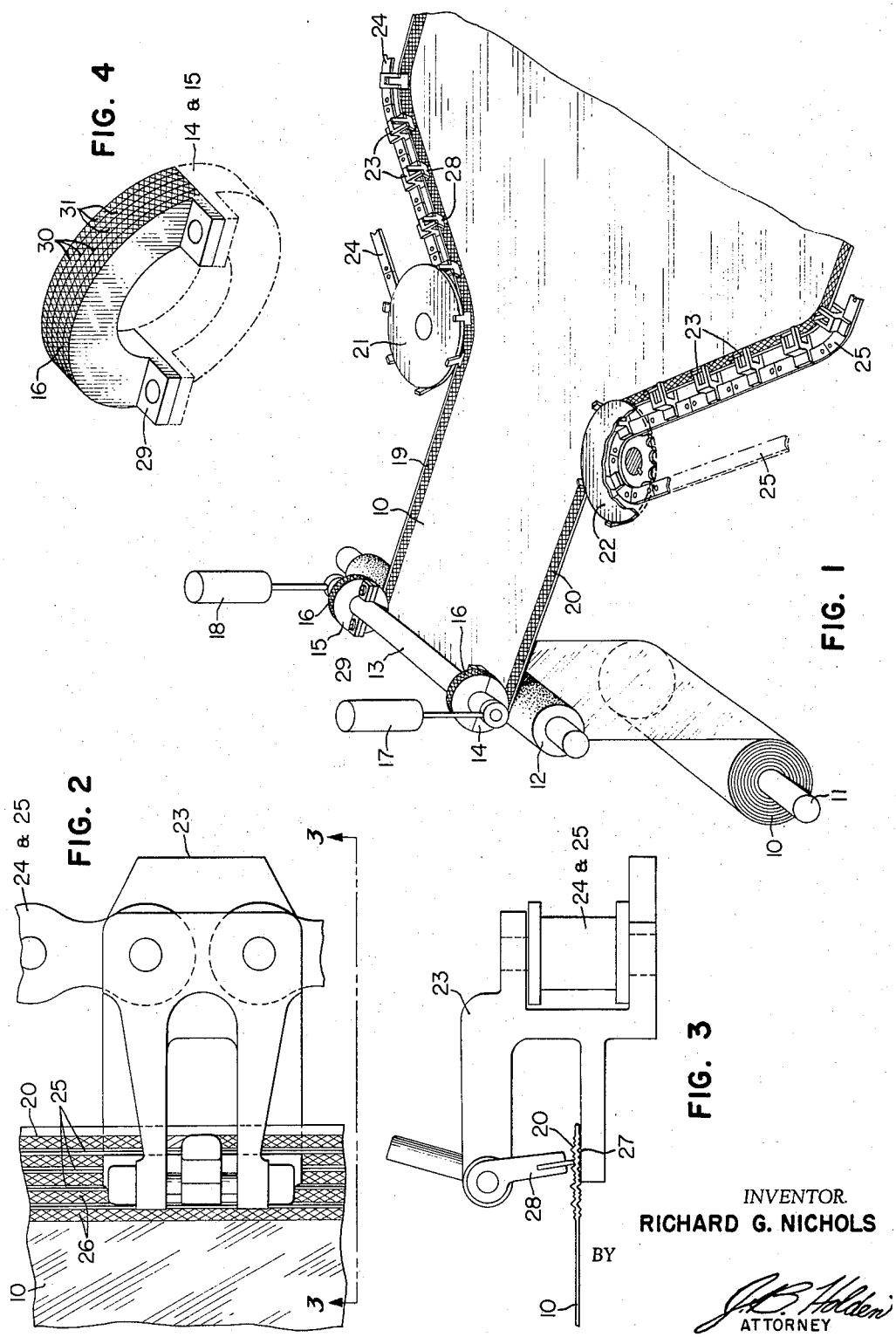

3,254,148
Patented May 31, 1966

3,254,148
FILM STRETCHING PROCESS
Richard G. Nichols, Cuyahoga Falls, Ohio, assignor to The Goodyear Tire & Rubber Company, Akron, Ohio, a corporation of Ohio
Filed Jan. 10, 1963, Ser. No. 250,578
4 Claims. (Cl. 264—288)

This invention relates to an improvement in the process of stretching plastic film. More particularly, the invention relates to an improved apparatus and process for stretching plastic film in a tenter frame stretching apparatus.

Many of the well-known plastic films such as polyamides, polyethylene and polyesters can be physically improved by stretching biaxially, thus orientating the molecular structure. In particular, polyethylene terephthalate and terephthalate copolyesters, including combinations produced by reacting ethylene glycol with ester-forming derivatives of terephthalic and isophthalic acids provide films with very high tensile strengths coupled with the ability to remain stable at relatively high temperatures. Orientation in copolyesters such as a 90/10 combination of terephthalic and isophthalic constitutents is achieved by extruding the resin material through a die to form a film and immediately thereafter supercooling it to obtain the film in the amorphous state. The amorphous film is then stretched after the film has been raised to a temperature above its second order transition temperature. It is particularly important to stretch orientate the film at a temperature as close to the second order transition temperature as possible so that a more uniformly stretched film will be produced.

Longitudinal elongation is easily accomplished by passing the film over a series of rollers that are traveling at different speeds with speeds with respect to each other, thus imparting molecular orientation in a uniaxial direction. The uniaxial molecular orientation produces increased tensile strength in the direction in which the film molecules are orientated. Also, such orientation produces lines of weakness in a direction normal to the elongation direction. Particular care must be exercised when orientation is attempted in the normal or transverse direction since the film has a tendency to break if the load is not introduced in an even manner. Transverse stretching is accomplished by passing the longitudinally stretched film through a tenter frame. As the film advances through the tenter frame, it is clamped along the edges by a series of closely spaced clamps which are in turn attached to a moving chain. The chain can be made to travel angularly outward from a direction parallel to the longitudinal axis of the film. As the chain and associated clamps travel outwardly the film is molecularly orientated in the transverse direction. A uniform transverse force can be realized only if there is no slippage of the film through the jaws of the clamps.

Heretofore, several methods have been employed to prevent film slippage through the jaws of tenter frame clamps. Some films are extruded with a thickened or beaded edge, thus providing a mechanical key to which the clamps can attach. This method has several inherent disadvantages in that considerably more material must be used in producing the beads, thus increasing the amount of scrap material. Also, the thickened edge section does not soften under the application of heat as quickly as does the less massive membrane portion of the film. This can produce detrimental stretching characteristics when longitudinal stretching is attempted. The beaded film must be produced as an integral unit at the time of extrusion; therefore, the thickened edge prevents efficient storage of the film in the rolled condition.

Another prior method of effecting positive edge retainment during tenter frame stretching has been to place pins through the film. This forms a positive gripping means; however, the edge continuity is disrupted and uneven stretching of the film results.

As has been mentioned before, it is desirable to stretch the film at the lowest possible temperature at which molecular orientation will occur. The primary advantage of stretching at a low temperature is that a more uniform film will result. As the film stretches transversely the thin areas will elongate until molecules therein become orientated. As orientation is completed, the film increases in strength, thus shifting the stretch load to the thick unstretched areas, thus causing elongation to occur there also. If the film is stretched at a higher temperature the thin areas will continue to become thinner, whereas the thicker areas will not elongate in the proper manner. Stretching at the lowest possible temperature results in a more uniform film; however, more total transverse force is required to obtain the optimum results. In the stretching of films such as ethylene terephthalate-ethylene isophthalate the transverse force is great enough to produce a complete disengagement of the film from the jaws of the tenter frame clamps. At or close to their second order transition temperatures plastic films are still relatively stiff, hard and smooth. Tenter frame clamps can be used to grasp the edge of a thin film being stretched at these temperatures, but thick films are not easily retained by the clamps. As the clamps are drawn apart in the tenter frame, the thick film may slip out from between the jaws of the clamps.

It was discovered that if a suitably knurled section was formed in the film area along the edge in the clamping zone, the clamps would then retain the film. While the present invention can be used in stretching thin films, it is particularly useful in stretching films having a thickness of 5 mils or more, thus by using the present invention plastic films having an original unstretched thickness of greater than 5 mils could be readily stretched in tenter frame apparatus using conventional smooth clamping means to hold the edge of the film.

It is therefore the primary object of the present invention to provide an improved system whereby the edges of a film may be prepared to insure adequate clamping during the transverse stretching thereof.

Another specific object of the invention is to provide a method of knurling the edges of the film subsequent to casting the film, but prior to transverse stretching.

A still further object is to provide a film with a clamping edge that requires no additional film mass.

An additional object is to provide knurling apparatus that can be readily mounted and dismounted.

These and other specific objects and advantages of the invention will be apparent from the following detailed description.

A clear understanding of the steps constituting the improved method, and of the construction and operation of the apparatus for carrying out the several steps in an expeditious manner, may be had by referring to the drawings which form a part of the specification.

FIG. 1 is a perspective view showing a typical apparatus for knurling the edges of a film;

FIG. 2 is an enlarged plan view of the film edge showing a clamp positioned on the knurled area;

FIG. 3 is a side view taken along lines 3—3 of FIG. 2; and

FIG. 4 is a perspective view of the knurling adaptor.

In FIG. 1 of the drawing a supply of rolled film stock 10 which is in the amorphous state is mounted on roll 11. Film 10 is trained over rubber-coated feed roll 12 and into the tenter frame stretching apparatus. Feed roll 12 is heated, thus softening film 10 as it passes thereover. Roll 13, which can be an ordinary roll, contains split segment knurling rings 14 and 15. The knurling segments can be readily mounted and disassembled and in addition can be adjusted transversely to accommodate various widths of film. The surfaces 16 of rings 14 and 15 are knurled with circumferential grooves and multi-directional serrations extending over the entire peripheral surface. The surfaces of these rolls are pressed into intimate contact with film 10 in the area along the edges of the film by pressure applied to the extremities of roll 13. Pneumatic actuators 17 and 18 provide a system of applying a variable pressure depending upon the characteristics and temperature of the particular film that is being processed. Film 10 is continuously passed over feed roll 12 where knurling rings 14 and 15 imprint knurled surfaces 19 and 20 on the surface near the edges of film 10 and is advanced to cam discs 21 and 22 where edge clamps 23 are held open to receive the film edges. Edge clamps 23 are advanced in a longitudinal direction by chains 24 and 25 and move at a speed slightly greater than the speed of the film as it exits from roller 12. In addition to longitudinal movement chains 24 and 25 move angularly in a transverse direction, thus causing the film to stretch. The clamps remain in clamped position through the entire transverse stretching operation.

FIG. 2 shows an enlarged plan view of film 10 containing knurled surface 20 which is grasped by clamp 23. The film is embossed by the knurling rings so that it contains continuous ridges 25 which are parallel to the film edge. Interpositioned between ridges 25 are serrations 26. Serrations 26 are angularly disposed with relation to parallel grooves 25, thus providing additional stability to the overall knurled surface 20.

FIG. 3 is an end view of FIG. 2 taken along lines 3—3 of FIG. 2. Film 10 is wedged between base 27 and the tongue 28 of clamp 23. Further axial pull toward the center of film 10 increases the clamping action. In addition, knurled surface 20 prevents the film from local stretching between tongue 28 and base 27.

FIG. 4 shows a typical segment of knurl-producing rings 14 and 15. The rings are semi-circular and are provided with lugs 29 which aid in quick assembly and disassembly from conventional rollers. Surface 16 is grooved at 30 and serrated therebetween by serrations 31. Grooves 30 produce ridges 25 on the film and serrations 31 produce serrated areas 26 on the film.

From the foregoing detailed description it is apparent that the present invention provides an improved method of holding the edge of a film while the film undergoes a stretch operation. The method is both simple and effective and can be used where the characteristics of the film make it difficult to hold. The improved method is particularly useful in stretching films such as polyamides, polyethylene and polyesters which can be considered to be stiff, hard and smooth in physical characteristics. The present method also eliminates undesirable viscoelastic effects including heating and friction which are associated in films containing a beaded or thickened edge section.

Then, too, the present invention permits a knurled surface to be placed at the edges of any film width.

While certain representative embodiments and details have been shown for purposes of illustration, it will be apparent to those skilled in this art that various changes and modifications may be made therein without departing from the spirit or scope of the invention.

I claim:
1. In the process of stretching a plastic film in combination the steps of
 (1) supplying a continuous film to knurling means;
 (2) heating said film by contacting it with heat means prior to indentation with said knurling means;
 (3) impressing a knurled area adjacent the edges of the film and parallel thereto;
 (4) cooling said knurled area prior to the fixation of tenter clamps thereon; and
 (5) clamping said film along the knurled edges and transversely stretching said film whereby orientation is produced in a transverse direction.

2. The method of knurling the edges of a film which includes the steps of
 (1) supplying a continuous orientable film to a knurling apparatus;
 (2) heating said film by passing it over a heated rubber-coated roll;
 (3) knurling an area of film adjacent the edges thereof and producing in said area a plurality of ridges that protrude from the film surface, said ridges containing therebetween angularly disposed serrations of lesser magnitude than said ridges;
 (4) cooling said knurled areas by suspension in air;
 (5) clamping said film in such a way that the clamp tongue engages the film in said knurled area, thus permitting a transverse load to induce orientation in said transverse direction when said clamps are moved angularly in a direction outwardly from a direction parallel to the longitudinal axis of the film.

3. In the process of stretching a film by holding the edge of the film and stretching the edges apart, the improvement which comprises embossing a selected area along the edges of the film with a knurled design, then clamping said embossed edges with a plurality of smooth faced clamps and stretching said film by applying a force to said clamps in a direction transverse to the longitudinal axis of the film, thus forcing the clamps apart.

4. In a continuous process for stretching a film in which a sheet of film is continuously advanced and stretched in a tenter frame by clamping the edges of the film in clamping devices and stretching the film by applying a force to the clamping devices to move them apart and then releasing the stretched film, the improvement which comprises continuously embossing the edges of the film, at least in a selected area, with a knurled design and subsequently applying the clamps to the embossed edges of the film as it advances into the tenter frame.

References Cited by the Examiner

UNITED STATES PATENTS

| | | | |
|---|---|---|---|
| 53,922 | 4/1866 | Halsey et al. | 18—10 |
| 1,651,744 | 12/1927 | Van Derhoef | 18—15 |
| 1,681,880 | 8/1928 | Schneible. | |
| 2,297,645 | 9/1942 | Bailey. | |
| 2,631,410 | 3/1953 | Drake | 65—199 |
| 2,723,936 | 11/1955 | Ryan | 156—209 |
| 2,778,057 | 1/1957 | Clark | 264—289 |
| 3,000,073 | 9/1961 | Zuck et al. | 18—1 |
| 3,046,599 | 7/1962 | Nicholas | 264—289 |
| 3,078,504 | 2/1963 | Koppehele | 264—289 |

FOREIGN PATENTS 561,623    5/1944    Great Britain.

ALEXANDER H. BRODMERKEL, *Primary Examiner.*
K. W. VERNON, *Assistant Examiner.*